United States Patent Office 3,491,580
Patented Jan. 27, 1970

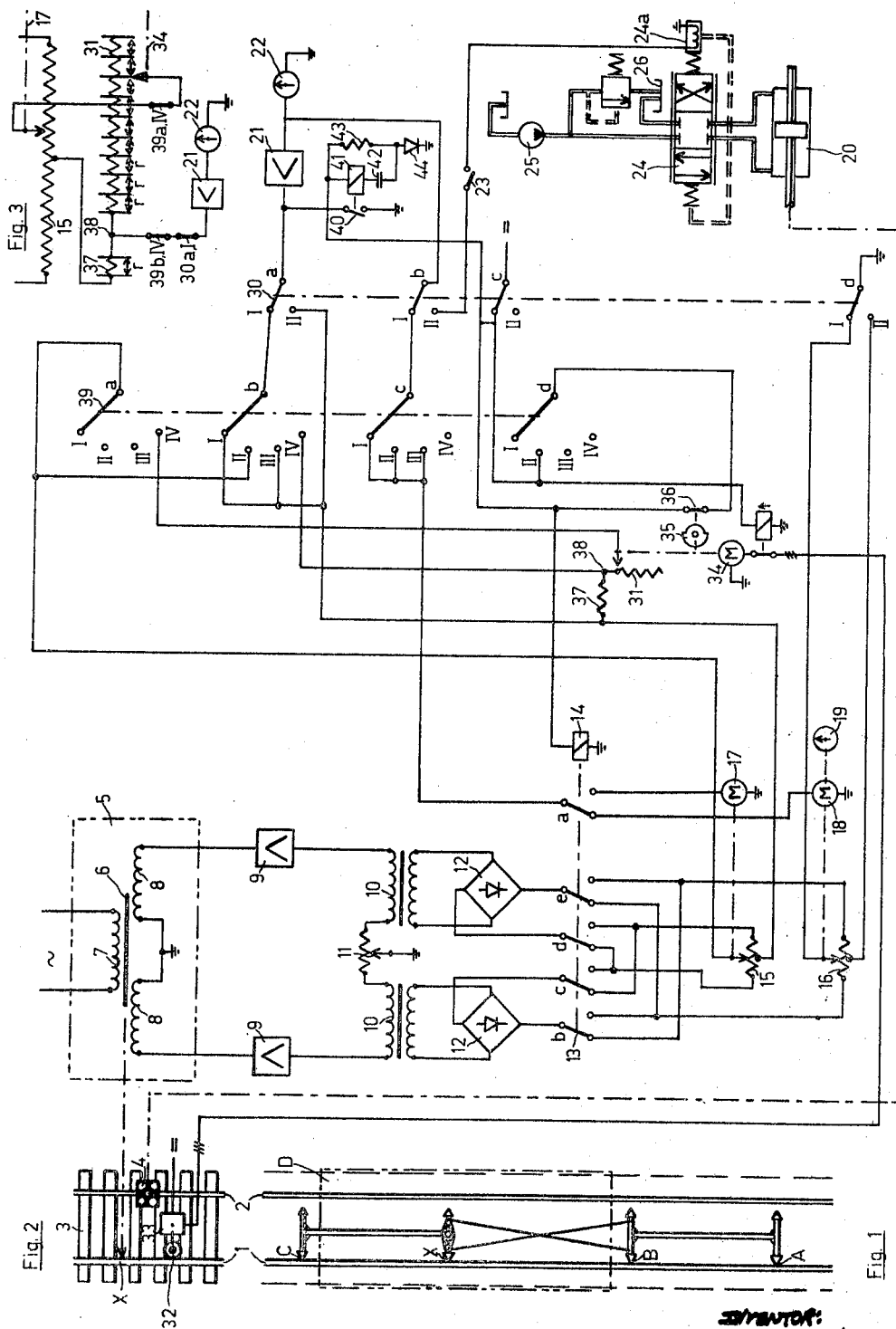

3,491,580
METHODS AND APPARATUS FOR ADJUSTING RAIL TRACK ALIGNING EQUIPMENT
Andre Fornerod, Pre Vert, Switzerland, assignor to Matisa Materiel Industriel, S.A., Crissier (VD) Switzerland, a coporation of Switzerland
Filed Apr. 22, 1968, Ser. No. 722,860
Int. Cl. G01c *25/00*
U.S. Cl. 73—1                           11 Claims

ABSTRACT OF THE DISCLOSURE

A method and apparatus for testing and adjusting the accuracy of a measuring apparatus serving to control a device for correcting the alignment of a railway track. The measuring apparatus comprises a certain number of sensing devices to sense the rails of the track, the sensing devices being mutually spaced from one another with at least two constituting a reference base which is movable along the track and at least one of which indicates, by its departure from the reference base, the positional error of the track. The method includes the steps of measuring a number of fluctuations from the norm along a rectilinear or arcuate portion of the track, deriving a mean algebraic fluctuation from the norm from the measurements so taken, and utilizing the mean algebraic fluctuation so derived for zeroing the said apparatus. The apparatus provides means for performing each step of the method.

The novel equipment used for putting this method into practice is characterized by a summating device for aggregating the measurements made by the apparatus, and a device which finds the quotient produced by dividing this sum by the number of measurements made, so as to provide the mean algebraic value of the measurement values taken.

---

The invention generally relates to a method of controlling a measuring apparatus for use in aligning a railway track, and to equipment for carrying out the method.

Automatic apparatus is being frequently used for levelling and for aligning railway tracks, the desired location of the railway track being set by means of a reference system which is movable along the track. This system incorporates a number of devices which sense a series of spaced points on the track rails and which are mutually spaced and interconnected so as to define a reference line of a suitable geometric shape. A system of two points theoretically suffices to define a straight line but, in practice, three points on the track are generally selected (two points on a portion of the track which has already been aligned and one point on a portion of the track which is to be aligned), so as to define an arc of a circle or a straight line, the latter constituting a special case. The track alignment consists in bringing into this arc or line, by means of a suitable rail deflecting apparatus, a fourth point which is located between the two portions of rail referred to above. The distance separating this fourth point from the reference arc or line represents the deviation from the required track path which has to be obviated when shifting the track.

An essential step in the preparations carried out on site consists in calibration of the measuring apparatus prior to use, so that when the fourth sensing device is located on the geometric line which is fixed by the position of the three other sensing devices, the measuring apparatus no longer emits signals indicating the need for correcting the track alignment, and the indicator of the apparatus indicates a zero deviation from the prescribed path.

One method of calibration consists in bringing the apparatus on to a section of the track whose path or alignment is known to be correct, and in then adjusting the apparatus until no further deviation signal is emitted. However, this method cannot be carried out on site because it is practically impossible to find a section of track whose alignment is sufficiently accurate to serve as a standard. Moreover, this section of track would have to be located close to the site, as it is generally necessary to dismantle the measuring apparatus for transport through any substantial distance.

In the absence of an accurately aligned section of track, it is possible to form a straight reference base by the application of wedges of varying thicknesses against the head of the rail. A wire stretched out parallel to the rails of the track is used for determining the thickness of the wedges. However, this method is very onerous, and the measuring apparatus frequently moves out of adjustment after the track alignment operation has been carried out a few times. This loss of the correct adjustment of the apparatus is the result of variations in internal stresses in the measuring apparatus which takes place when static adjustments are effected while the vehicle is stopped.

Thus a need still exists for a method and apparatus for adjusting rail track aligning equipment, such method and apparatus being operable in "on site" locations in an accurate, yet relatively simple manner. It is the primary object and purpose of the subject invention to satisfy this exisiting need.

The above object as well as other objects are implemented by the subject invention which contemplates the provision of a method of testing and adjusting the accuracy of a measuring apparatus serving to control a device for correcting the alignment of a railway track, which measuring apparatus comprises a certain number of sensing devices serving to sense the rails of the track, these sensing devices being mutually spaced from one another and at least two of which constitute a reference base which is movable along the track and at least one of which indicates, by its departure from the reference base, the positional error of the track, comprising the steps of measuring a number of fluctuations from the norm along a rectilinear or arcuate portion of the track, deriving a mean algebraic fluctuation from the norm from the measurements so taken, and utilizing the mean algebraic fluctuation so derived for zeroing the said apparatus.

The advantage of this method resides in the fact that it introduces the statistical laws relating to large numbers, in which the deviations existing in the portion of the track serving as a standard mutually compensate one another.

The equipment used for putting this method into practice is characterized by a summating device for aggregating the measurements made by the apparatus, and a device which finds the quotient produced by dividing this sum by the number of measurements made, so as to provide the mean algebraic value of the measurement values taken.

The invention itself will be better understood and additional features and advantages thereof will become readily apparent from the following detailed description of a preferred embodiment thereof, said description making reference to the appended drawings, wherein:

FIGURE 1 diagrammatically represents the arrangement of the rail sensing devices;

FIGURE 2 is a diagram of the electric and hydraulic circuits used for carrying out the method according to the invention;

FIGURE 3 is a simplified extract from this same diagram;

Figure 4:
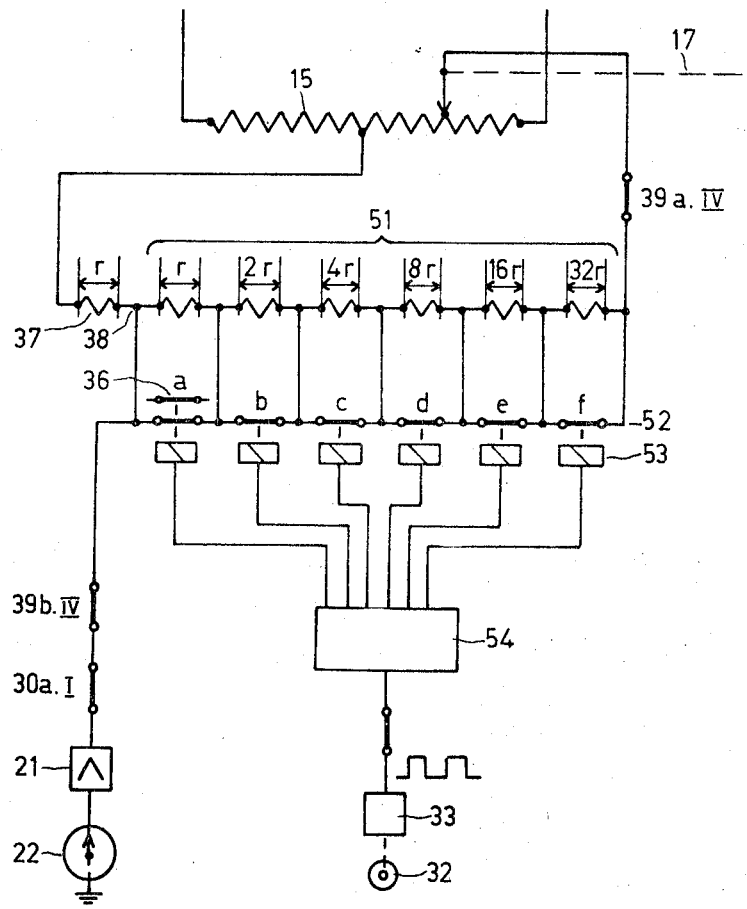
FIGURE 4 is a modified arrangement of the unit shown in FIGURE 3.

In FIGURES 1 and 2 of the drawings, the track is diagrammatically represented by two rails 1, 2 and by the sleepers or ties 3. The rail 1 functions as a control rail. Its path or contour is sensed by a known sensing unit comprising four sensing devices A, B, C, X. These sensing devices are interconnected by a mechanical linkage which enables any deviation of the sensing device X from an arc of a circle defined by the three other sensing devices A, B, C to be detected.

The four sensing devices A, B, C, X move with the railway vehicle D which carries, in the region of the sensing device X, equipment for aligning the track which is represented in FIGURE 2 by rollers 4.

The sensing device X transmits its movements to a receiving unit 5 whose housing is mounted in fixed relation to the three sensing devices A, B, C.

The receiving unit 5 is an electrical transducer which translates the movements of the sensing device X into electric signals. In the disclosed embodiment, the transducer constitutes a differential transformer which is sensitive to linear displacement of its core 6, and which has a primary winding 7 fed by an A.C. voltage of specified amplitude and frequency.

Two secondary windings 8 of the differential transformer feed a closed circuit having two branches, each of which includes an A.C. amplifier 9 and the primary winding of a transformer 10. The circuit is connected to ground at two points, one between the windings 8, and one through a slider 11 of a potentiometer interposed between the primary windings of the transformers 10. Slider 11 which is adjustable by hand, allows the current in the two branches to be balanced.

When the core 6 and the slider 11 occupy a symmetrical position, the two secondary windings of the transformers 10 produce currents of equal amplitude but of opposite phase. When the core 6 is moved, the two currents are caused to differ in their amplitude and phase, which allows them to be compared by means of a Wheatstone-type measuring bridge.

To this end, the two currents induced in the secondary windings of the transformers 10 are rectified by rectifiers 12 and passed to two motor potentiometers 15, 16. Four switches 13b, c, d and e actuated by an electro-magnet relay 14 serve, when required (as described below), to reverse the connections between the ends of the potentiometers 15 and 16 and the outputs of the rectifiers 12.

Each of the potentiometers 15, 16 comprises a fixed center tap and a sliding tap. The sliding tap of potentiometer 15 is actuated by the electro servo-motor 17 and that of the potentiometer 16 by the electric motor 18. The latter combination is furthermore provided with a dial 19 indicating the position of the slider.

The voltage present between the center fixed point of potentiometer 15 and ground constitutes the signal controlling a hydraulic rail aligning jack 20. This control signal, which originates from the track sensing devices, is then finally returned to the track aligning rollers. The control signal is first amplified in a D.C. amplifier 21 with the value of the amplified signal being indicated on the voltmeter 22. The signal itself is fed when switch 30b is in position II as described below through a hand- or foot-pedal-operated switch 23 to the control solenoid 24a of the servo-valve 24, which opens and closes the ducts connecting the two pressure chambers of the jack 20 to, on the one hand, a pump 25 supplying driving fluid for the jack 20 and, on the other hand, to the supply tank 26 containing the driving fluid. In the absence of a control signal, the servo-valve 24 occupies its center position in which the pressure chambers of the jack 20 are closed and the piston of the jack immobilized. The servo-valve 24 is thus controllable progressively and symmetrically according to the amplitude and the sign of the electric signal, in both directions.

A ganged switch 30 having four branches 30a–30d has two positions I and II, the first of which serves to adjust the control circuit and the second to control the track alignment. In position II, the center stationary tap of the potentiometer 16 is connected to ground via branch 30d and thus determines the reference voltage of the comparison circuit comprising potentiometers 15 and 16. The central fixed tap of potentiometer 15 is connected, via branch 30a, to amplifier 21. The signal from amplifier 21 is passed, via branch 30b and switch 23, to the servo-valve 24, as has been described above.

In operation, linear displacement of the core 6 of transducer 5 caused by local deformation of the rail 1 modifies the balance of the currents in the Wheatstone bridges.

The center fixed tap of potentiometer 15 consequently gives rise to a voltage which corresponds in sign and amplitude to the error recorded by the sensing device. This voltage results in a control signal which acts on the servo-valve 24 and causes pressurized fluid to enter into the appropriate chamber of jack 20, the other chamber being simultaneously opened to the outlet duct communicating with the supply tank 26. The jack 20 thus shifts the rail so as to correct the error recorded. When the core 6 has been brought back to its central position, the voltage at the fixed center tap of the potentiometer 15 returns to zero. The servo-valve 24, to which no voltage is now applied, once again assumes its center position and closes the ducts leading to the pressure chambers of the jack 20.

The procedures which have just been described can be considered as an application of automatic control by electronic means to the correction of the alignment of railway tracks. These control circuits do not constitute improvements in the art even insofar as they relate to railway tracks, so that the detailed description can be restricted to the method of adjusting the control system.

The accuracy of track alignment operations depends on the precise calibration of the comparison circuit. This adjustment can be considered perfect if the signal for controlling the servo-valve 24 is zero when the track is in a condition of correct alignment. This adjustment, within the context of the invention, forms the subject matter of the following description. The equipment necessary to achieve this aim will be discussed below.

The vehicle carrying the necessary equipment is brought on to a rectilinear section of track which is assumed to have defects or errors both in a horizontal and in vertical plane, these errors lying within the limits of tolerance allowed for each railway network in laying and in maintaining the track.

It would be unreasonable to expect to find, along a length of track, a region in which the four sensing devices A, B, C, X define an absolutely straight line. Moreover, this is often impossible by virtue of the fact that the reference base may extend over a length of the order of 20 meters, with a distance of about 5 meters between adjacent sensing devices.

The operator would stop the vehicle at any point of the rectilinear section of rail. At this point the control rail 1 may have a slight deformation. However, with the arrangement of the invention, it is possible to adjust the control system with an accuracy which is completely adequate.

In particular, the arrangement of the invention is equipped with a slider moved by motors 17 and 18, mentioned above, and with a variable resistance 31 (FIGURE 3) having a slider variable by means of an electric motor 34 connected to a device for measuring the track travelled over. This device comprises a sensing wheel 32 (FIGURE 2) which moves over the rolling surface of the control rail 1. A pulse generator 33 emits an electric signal each time that wheel 32 has passed through a predetermined number of revolutions. Each pulse emitted causes motor 34 to rotate through a predetermined angle of rotation. This motor drives, in addition to the slider of the variable resistance 31, a cam 35 which is rigidly keyed to its associated shaft and which opens or closes a switch 36. A control knob enables the slider to be brought back to its starting point on the resistance 31. Cam 35 is keyed to the shaft in such a way that switch 36 will be closed when the slider occupies its starting position, which is visible in FIGURE 2.

A first stage of the adjusting operation consists in returning the slider to this position.

The variable resistance 31 is directly connected to a fixed resistance 37. The value of the latter is equal to the increase in the resistance 31 consequent upon an impulse emitted by the pulse generator 33. A point 38, between resistance 31 and resistance 37, is connected so that its potential can be measured by voltmeter 22 through amplifier 21 and through the intermediary of branch 39b of a multiple-branch switch 39 and of branch 30a of switch 30.

For the next stage of the adjusting operation, switches 30 and 39 are in position I. It should be noted that the control signal coming from amplifier 21 passes, via the switching branches and contacts 30b, 39c, and 13a, to motor 18. The electric signal coming from the fixed center tap of potentiometer 15 arrives at amplifier 21 via switching branches 39b and 30a. If a potential is present at the center tap of potentiometer 15, motor 18 is energized until this potential is removed.

Movement of the slider 11 enables balance to be restored between the branches of the comparison bridge, whatever the position of sensing device X may be. This feature is used to bring the slider of potentiometer 16 back to its center position; this position being displayed on indicating device 19.

For the next stage of the adjusting procedure, switch 39 is brought to position II. The closure of contact 39d causes relay 14 to be energized, so that switch contact 13a routes the control signal from amplifier 21 to motor 17. The signal to be amplified and which is controlled by the position of the slider of potentiometer 15 is routed, by branches 39b (in position II) and 30a (in position I) to amplifier 21. In order to prevent any operational disturbances from developing, it has been found necessary to pass the electric signal to ground before it reaches amplifier 21 and while switch 13 is being thrown. The signal is passed to ground in the manner referred to above by means of a contact 40 which is normally open and which is actuated by a quick-acting relay 41. A capacitor 42 and a resistance 43 which are coupled to a diode 44 causes relay 41 to be energized each time switch 36 is opened or closed. The duration of this energization, which is suitably related to the response time of relay 14, is a function of the electrical characteristics of capacitor 42 and of resistance 43. As soon as contact 40 is open and the electric signal has passed to amplifier 21, the slider of potentiometer 15 assumes its center position by reason of the balanced condition of the Wheatstone bridge.

The vehicle is then moved along the railway track. If the path or contour of the control rail of the track shows any deviation from the correct alignment thereof, the position of the core 6 is modified, which affects the balances of the Wheatstone bridge. The position of the slider of potentiometer 15 gives rise to a signal which energizes motor 17. The latter shifts the slider in a direction such as to reduce the value of the signal. When this signal is zero, motor 17 stops. The slider assumes a position which corresponds at each moment to the deviation of sensing device X with respect to its starting position. The direction of the deviation of the sensing device is also taken into account.

When the vehicle has passed through a specified distance, the pulse generator 33 sends a pulse to motor 34 which passes through a certain angle of rotation, which causes slider of resistance 31 to be moved through one unit. Cam 35 performs one half revolution and opens switch 36. Relay 14 is no longer energized and switch 13 once again assumes the position shown in the drawing. Motor 17 is then de-energized and the slider of potentiometer 15 is stationary during the next portion of the track travelled over. The signal still acts on the slider of potentiometer 15, but it is now passed to motor 18. Moreover, the action of throwing switch 13 has reversed the polarity of potentiometers 15 and 16.

The result of this reversal is that the slider of potentiometer 16 assumes a position which exactly corresponds to that of the slider of potentiometer 15.

The slider of potentiometer 16 now oscillates about this new position in response to the movements of the sensing device X until the instant of the next reversal of polarity which takes place at the end of the second region of railway track travelled over. The slider of resistance 31 moves forward to the extent of a further unit and the slider of potentiometer 15 takes up a position analogous to that of the slider of potentiometer 16. The portion of resistance lying between this position and the center position is equivalent to the algebraic sum of the fluctuations of sensing device X on the occasion of the first and second polarity reversals.

When these movements are continued along the length of the track, the sliders of potentiometers 15 and 16 successively algebraically add each positional deviation from the norm recorded by the sensing device X at the instant at which the polarity reversal takes place.

About thirty values are usually added algebraically together before the vehicle is stopped, care being taken to ensure that no extreme position is assumed by either slider.

When the vehicle has been stopped, it is first necessary to wait until the sliders of potentiometers 15 and 16 are stationary. The operator then places switch 39 in position III. Relay 14 is de-energized and the reversing switch 13a connects the output of amplifier 21 to motor 18. In this position, the amplifier 21 is fed by a signal derived from the fixed center tap of potentiometer 15 such that the potential of the center tap is effectively cancelled or removed.

The portion of resistance lying between the position of the slider and the center tap of the potentiometer 16 is equivalent to the deviation from the norm recorded by the sensing device X in the region in which the vehicle has stopped.

The operator now places switch 39 in position IV (switch 30 is still in position I). Cam 39C prevents the motors 17 and 18 from being started so that the sliders coupled with these motors remain stationary. The slider of potentiometer 16 is still connected to ground.

The portion of resistance lying between the slider and the center fixed tap of potentiometer 15 corresponds to the total of the deviations from the norm recorded by sensing device X at each polarity reversal. The slider of resistance 31 has in its turn aggregated the number of resistance units corresponding to the number of deviations from the norm recorded.

When switch 39 is in position IV, amplifier 21 is connected to the junction point 38 between resistances 31 and 37, while the Wheatstone bridge is connected to ground by the slider of potentiometer 16.

The value of the voltage at point 38 lies between the values measured at the center fixed tap of potentiometer 15 and at the slider of the same element, the precise value being determined by the position of the slider of the resistance 31. In other words, the voltage difference between the center tap and the slider of potentiometer 15, which difference corresponds to the algebraic sum of the deviations from the norm is divided by the number of units of the track travelled over by the railway vehicle. The function of the voltage divider provided by the resistance 31 will be more clearly seen by referring to the diagram of FIGURE 3.

The last phase of the zero adjustment consists in moving the slider by hand until the voltmeter 22 indicates zero voltage. In this working phase, the Wheatstone bridge is balanced for the mean value of the deviations from the norm which have been recorded, in relation to the deviation existing at the point when the vehicle is stopped, this latter-mentioned deviation being recorded by the positioning of the slider of the potentiometer 16 in the preceding working phase in which the switch 39 was in position III.

When switch 30 is thrown into position II, the deviation from the norm at the place where the vehicle is stopped represented between the center fixed taps of potentiometers 15 and 16 is indicated on the voltmeter 22. If the railway vehicle again passes over the same distance travelled for purposes of verification and with the switch 30 in position II, it will be observed that the value indicated by the voltmeter 22 oscillates around zero value, which provides confirmation that the adjustment was correct.

The invention, of course, is not limited to the embodiment described. It is also applicable to levelling as well as alignment of the track. The detection of the fluctuation of the position of the track from the norm can be effected in other ways using systems of measurement other than that illustrated in FIGURE 1. In the opening paragraphs of the specification, reference was made to a system based on the measurements of errors on a cord stretched between two sensing devices. Also known are detectors based on the measurement of angles between several radial beams diverging from a central point towards measurement points, located along the control rail of the track.

The nature of the detecting transducer (transformation of a linear deviation from the norm into an electric signal) may also vary. In the examples described, the transducer is of the inductive type but, also available on the market, are transducers of capacitative type or those which operate on the basis of variation in ohmic resistance. It would be within the skill of one versed in the art of electronic control systems to modify the unit serving to amplify the electric signals provided by the transducer. It is also possible to find on the market assemblies in which this amplifying unit is incorporated in the housing of the transducer so that the output can be directly fed, through the intermediary of a switch, to the end points of the potentiometers of the comparison bridge. The control transducer (transformation of the amplifier control signal into a flow of pressurized fluid capable of bringing about movements of the rail track such as to cancel the positional deviation of the track from the prescribed alignment thereof) can also be of a different type. In the preferred embodiment disclosed, the control of the flow of pressurized fluid is supposed to be a stepless or progressive one, but it could be replaced by a "hit or miss" (all or nothing) system of control. Finally, the energy necessary for shifting the track could, for example, be supplied by an electric motor in which the above-mentioned transducer would control the strength of an electric current instead of controlling the flowing of pressurized fluid.

The wiring diagram of FIGURE 4 shows another form of the potential divider. Those parts of FIGURE 4 which are found in FIGURE 2 have the same reference numerals as in FIGURE 2.

In place of the variable potentiometer 31 adjusted by means of the electric motor 34, a chain of resistances 51 are provided which are brought into circuit by electronic means. Each resistance of this chain has a fixed value, which is twice the value of the preceding resistance. The first resistance 51a has the value r, which is the same as the separate resistance 37.

With this system, it is possible to obtain an arithmetical progression of resistance beginning from r to 63r. For this purpose the resistance 51a . . . 51f are bypassed by contacts 52a . . . 52f. These contacts are opened and closed by relays 53 in a predetermined order, which is controlled by an electronic counter 54. This counter receives the counting impulses from a pulse generator 33 related to the movement of the sensing wheel 32.

Initially, the contact 52a is opened, then after the next pulse the contact 52b is opened, after the third impulse the contacts 52a and 52b, after the fourth impulse only the contact 52c is opened, etc., so that the total resistance of the chain 51 increases in the forementioned arithmetic progression.

The counter 54 opens and closes the contact 36. It replaces therefore, the regulating motor 34 and the cam 35.

The wiring according to FIGURE 4 does not change in any way the method of regulating the measuring device, described in the specification for FIGURE 2 and FIGURE 3.

As should now be apparent, the objects initially set forth at the outset of this specification have ben successfully achieved.

What is claimed is:

1. Equipment for testing and adjusting the accuracy of a measuring apparatus carried by a railway vehicle serving to control a device for correcting the alignment of a railway track, which measuring apparatus comprises a certain number of sensing devices serving to sense the position of rails of the track, the sensing devices being mutually spaced from one another and at least two of which constitute a reference base defining a norm which is movable along the track and at least one of which indicates, by its departure from the reference base, the positional error of the track, said equipment comprising: summating means for summing the measured values of positional error of the track from the norm taken at a plurality of locations along a given portion thereof; divider means for dividing the sum of the measured values of positional error from said summating means by the number of measurements taken, said divider means deriving a mean algebraic fluctuation of positional error from the norm; and adjusting means for zeroing the measuring apparatus by utilizing said mean algebraic fluctuation derived from said divider means.

2. Equipment as defined in claim 1, further including a rail deviation detector means adapted to be coupled to the sensing device in the measuring apparatus which indicates the positional error of the track; measuring transducer means coupled with said rail deviation detector, said measuring transducer means transforming the detected positional rail fluctuation from the norm into two electrical signals at the outputs thereof indicative of the fluctuation from the norm; comparison bridge assembly means for comparing said electrical signals, said comparison bridge assembly means comprising first and second potentiometers connected at their end points to the outputs of said measuring transducer means, said first and second potentiometers having center tap means for providing a comparison signal; an adjusting potentiometer means for zeroing by manual adjustment said comparison signal; a power stage means having an input and an output, said power stage means transforming said comparison signal into a control signal for controlling a powered apparatus capable of modifying the track alignment; and an indicator means for indicating the existence of said comparison signal.

3. Equipment as defined in claim 2, further comprising a reversing switch means interposed between the outputs of said measuring transducer means and the end points of said first and second potentiometers of said comparison bridge assembly means; and relay means responsive to the distance travelled by the railway vehicle along the given portion of the track for actuating said reversing switch means.

4. Equipment as defined in claim 3, wherein said first potentiometer is manually and selectively grounded through a fixed center tap or through a movable tap having a slider; and first motor means responsive to said comparison signal for moving said slider of said first potentiometer.

5. Equipment as defined in claim 4, wherein said second potentiometer is manually and selectively connected to the input of said power stage means through a fixed center tap or through a movable tap including a slider; and second motor means responsive to said control signal for moving said slider of said second potentiometer.

6. Equipment as defined in claim 5, further including voltage divider means comprising a fixed resistance and a variable resistance having a slider; third motor means responsive to the distance travelled by the railway vehicle along the given portion of the track for moving said slider of said variable resistance; said voltage divider means being coupled between said fixed and movable taps of said second potentiometer.

7. Equipment as defined in claim 6, further including a hand switch means interposed between said comparison bridge assembly means and said power stage means, said hand switch means selectively coupling and routing said comparison signal from said fixed and movable taps of said second potentiometer to the input of said power stage means or from said voltage divider means to the input of said power stage means.

8. Equipment as defined in claim 7, wherein a further hand switch means is inserted at the output of said power stage means for selectively routing said control signal to a power transducer means for transforming said control signal into mechanical power for application to the device for correcting alignment or to said first and second motors for moving said sliders of said first and second potentiometers.

9. Equipment as defined in claim 8, wherein an additional switch means is interposed between said power stage means and said first and second motors for said sliders of said first and second potentiometers of said comparison bridge assembly means, said additional switch means selectively routing said control signal to said first or said second motor of the sliders of said first and second potentiometers, respectively, said additional switch means being actuated by said relay means responsive to the length of the track travelled over.

10. Equipment as defined in claim 9, wherein a detector/transducer means is provided which emits control pulses as a function of the length of the track travelled over by the railway vehicle and which supports said rail deviation detector means; said detector/transducer means causing said relay of said reversing switch means and said third motor for said voltage divider means to act in response to the length of track travelled over.

11. A method of testing and adjusting the accuracy of a measuring apparatus serving to control a device for correcting the alignment of a railway track, which measuring apparatus comprises a certain number of sensing devices serving to sense the position of rails of the track, the sensing devices being mutually spaced from one another and at least two of which constitute a reference base defining a norm which is movable along the track and at least one of which indicates, by its departure from the reference base, the positional error of the track, said method comprising the steps of: measuring a plurality of fluctuations from the norm along a rectilinear or arcuate portion of the track; deriving a mean algebraic fluctuation from the norm from the measurements so taken; and utilizing the mean algebraic fluctuation so derived for zeroing the measuring apparatus.

References Cited

UNITED STATES PATENTS 3,314,154    4/1967    Plasser et al.
3,380,394    4/1968    Fornerod _____ 104—8

S. CLEMENT SWISHER, Primary Examiner

U.S. Cl. X.R.

33—144